United States Patent
Wu et al.

(10) Patent No.: US 11,663,470 B2
(45) Date of Patent: May 30, 2023

(54) METHOD AND SYSTEM FOR ACCELERATING BOOT TIME

(71) Applicant: Acer Incorporated, New Taipei (TW)

(72) Inventors: Mei-Chun Wu, New Taipei (TW); Ling-Fan Tsao, New Taipei (TW); Shu-Chun Liao, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 348 days.

(21) Appl. No.: 16/832,301

(22) Filed: Mar. 27, 2020

(65) Prior Publication Data

US 2020/0372346 A1   Nov. 26, 2020

(30) Foreign Application Priority Data

May 20, 2019   (TW) .................. 108117311

(51) Int. Cl.
*G06F 15/177* (2006.01)
*G06F 9/00* (2006.01)
*G06N 3/08* (2023.01)
*G06F 9/4401* (2018.01)
*G06N 3/04* (2023.01)

(52) U.S. Cl.
CPC ............ *G06N 3/08* (2013.01); *G06F 9/4403* (2013.01); *G06N 3/04* (2013.01)

(58) Field of Classification Search
CPC .......... G06N 3/08; G06N 3/04; G06F 9/4403; G06F 11/3055
See application file for complete search history.

(56) References Cited

U.S. PATENT DOCUMENTS

| 2011/0055540 A1* | 3/2011 | Lin ................. G06F 9/4406 713/2 |
| 2012/0191960 A1* | 7/2012 | Piwonka ............ G06F 9/441 713/2 |
| 2014/0095856 A1* | 4/2014 | Tearse-Doyle ....... G06F 9/4401 713/2 |
| 2014/0191041 A1* | 7/2014 | Zhao .............. G06K 19/0723 235/492 |

(Continued)

FOREIGN PATENT DOCUMENTS

| CN | 107341094 A | 11/2017 |
| CN | 107729125 A | 2/2018 |

OTHER PUBLICATIONS

Wang Wenqiang, English Translation of CN 107341094, 2017 (Year: 2017).*

(Continued)

*Primary Examiner* — Xuxing Chen
(74) *Attorney, Agent, or Firm* — McClure, Qualey & Rodack, LLP

(57) ABSTRACT

An accelerating boot time system includes a memory and a processor. The memory is configured to pre-store a boot process to be performed on the first boot. The processor is configured to directly read the boot process from the memory and execute the boot process when the first boot is performed. Also, the processor executes a monitoring process to monitor a plurality of hardware usage rates of the plurality of devices each time the device is powered up, and inserts the hardware usage rates into a machine learning algorithm to determine whether a particular process supported by the devices is abnormal.

14 Claims, 4 Drawing Sheets

(56) References Cited

U.S. PATENT DOCUMENTS

| | | | | |
|---|---|---|---|---|
| 2014/0215199 A1* | 7/2014 | Ma | ............... | G06F 9/4406 |
| | | | | 713/2 |
| 2015/0134946 A1* | 5/2015 | Peterson | ............. | G06F 9/451 |
| | | | | 713/2 |
| 2016/0112203 A1* | 4/2016 | Thom | ............. | G06F 21/53 |
| | | | | 713/176 |
| 2019/0026531 A1* | 1/2019 | Alvarez Gonzalez | ............ | |
| | | | | G06V 20/17 |
| 2019/0187917 A1* | 6/2019 | Baldysiak | ......... | G06F 12/0804 |

OTHER PUBLICATIONS

Ni Bingju, English Translation of CN 107729125, 2018 (Year: 2018).*

Chinese language office action dated Mar. 23, 2020, issued in application No. TW 108117311.

* cited by examiner

METHOD AND SYSTEM FOR ACCELERATING BOOT TIME

CROSS REFERENCE TO RELATED APPLICATIONS

This application claims priority of Taiwan Patent Application No. 108117311, filed on May 20, 2019, the entirety of which is incorporated by reference herein.

BACKGROUND OF THE INVENTION

Field of the Invention

The present disclosure relates to a booting system and, in particular, to a method for accelerating boot time and a system for accelerating boot time.

Description of the Related Art

Out-of-Box Experience (OOBE) is the experience of the consumer when preparing to use a new computer for the first time. The OOBE refers to the process of initially performing the installer experience when the computer runs the operating system, such as setting whether to connect to a network, selecting a language, setting the account/password, and so on. This process usually depends on the hardware settings of the computer, and the general user will find that the execution speed is slow.

In addition, after the computer is turned on and off a lot of times, if the user feels that the computer takes longer to boot, it is generally to clean the hard disk, delete unnecessary files and remove unnecessary programs. However, it is still not possible to remove the necessary programs. Thus, the user's ability to optimize boot time is limited.

Therefore, how to provide a system and method for accelerating boot time to improve user experience has become one of the problems to be solved in the field.

BRIEF SUMMARY OF THE INVENTION

In accordance with one feature of the present invention, the present disclosure provides an accelerating boot time system. The accelerating boot time system comprises a memory and a processor. The memory is configured to pre-store a boot process to be performed on the first boot. The processor is configured to directly read the boot process from the memory and execute the boot process when the first boot is performed. Also, the processor executes a monitoring process to monitor a plurality of hardware usage rates of the plurality of devices each time the device is powered up, and inserts the hardware usage rates into a machine learning algorithm to determine whether a particular process supported by the devices is abnormal.

In accordance with one feature of the present invention, the present disclosure provides an accelerating boot time method. The accelerating boot time method comprises pre-storing a boot process to be performed by a memory on the first boot; directly reading the boot process from the memory and executing the boot process when the first boot is performed; and executing a monitoring process to monitor a plurality of hardware usage rates of the plurality of devices each time the device is powered up, and inserting the hardware usage rates into a machine learning algorithm to determine whether a particular process supported by the devices is abnormal.

The accelerating boot time method and the accelerating boot time system shown in the present invention provide a method and a system of using a machine learning algorithm with the memory of Optane™ technology to accelerate the process of OOBE set-up procedure. Also, the boot time is improved for providing overall boot efficiency.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
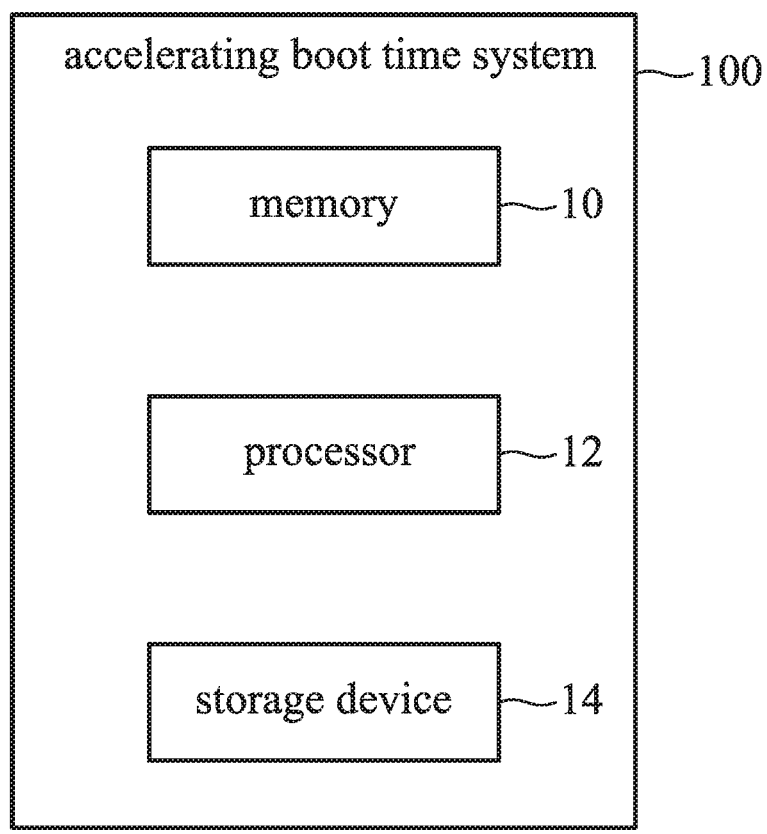
FIG. 1 is a block diagram of an accelerating boot time system in accordance with one embodiment of the present disclosure.
Figure 2:
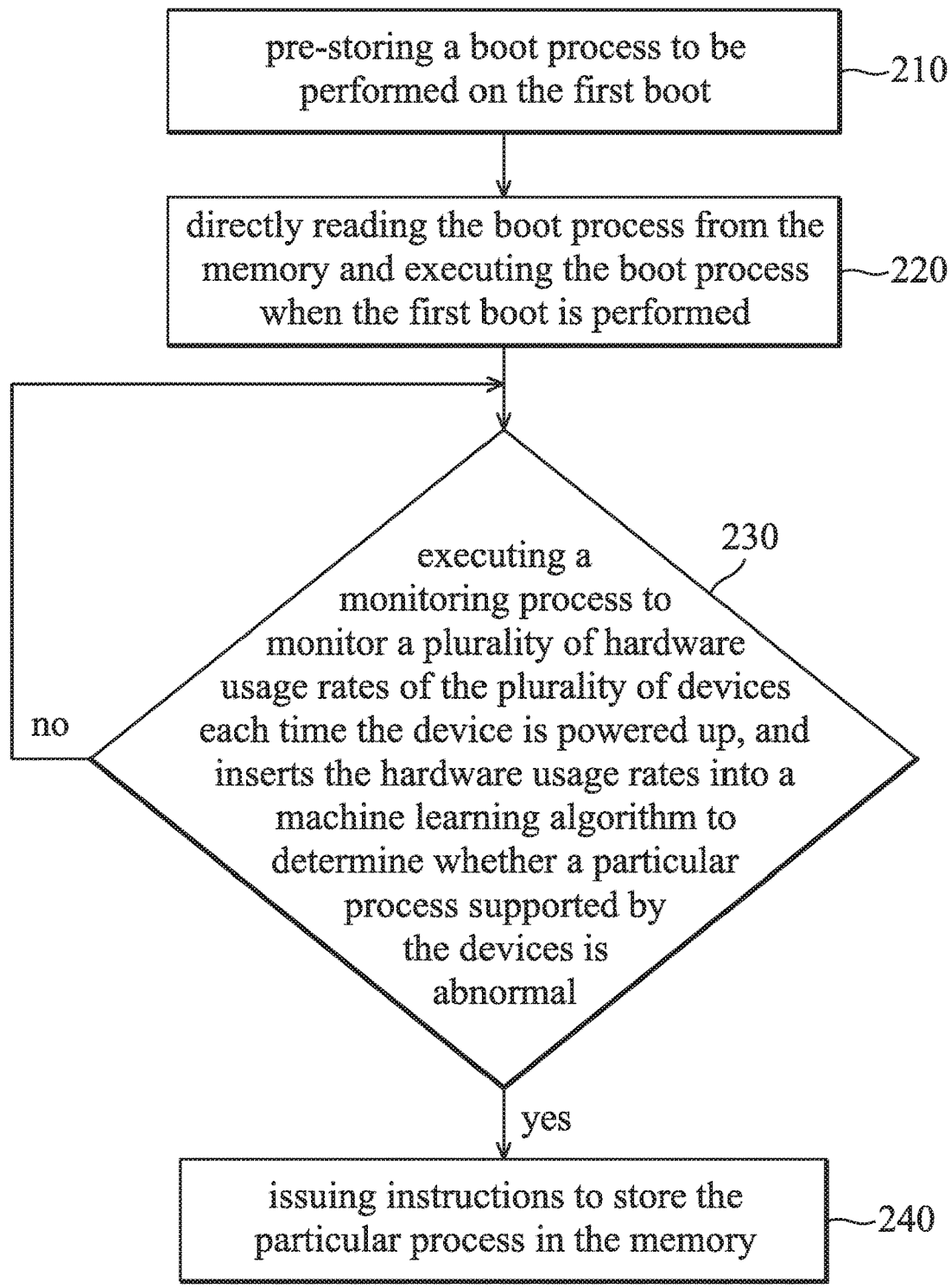
FIG. 2 is a flowchart of an accelerating boot time method of the data forwarding system in accordance with one embodiment of the present disclosure.

Refer to FIG. 1 and FIG. 2, FIG. 1 is a block diagram of an accelerating boot time system 100 in accordance with one embodiment of the present disclosure. FIG. 2 is a flowchart of an accelerating boot time method 200 in accordance with one embodiment of the present disclosure.

As shown in FIG. 1, the accelerating boot time system 100 includes a memory 10 and a processor 12. In one embodiment, the accelerating boot time system 100 can be implemented in a notebook computer, a desktop computer, a tablet, a mobile phone or other electronic device.

In one embodiment, the memory 10 is a memory using Optane™ technology. Optane™ technology provides high throughput, low latency, high QoS and high endurance. Since Optane™ technology is a known technology, it is not described here. In addition, the person skilled in the art should understand that the memory 10 of the present invention can be implemented by various memories which access speed is higher than the solid state hard disk. However, it is not limited thereto.

In one embodiment, the processor 12 can be implemented by using an integrated circuit, such as a microcontroller, a microprocessor, a digital signal processor, an application specific integrated circuit (ASIC), or a logic circuit. However, it is not limited thereto.

In one embodiment, the accelerating boot time system 100 further includes a storage device 14. The storage device 14 can be implemented as a read-only memory, a flash memory, a floppy disk, a hard disk, a compact disk, a flash drive, a tape, a network accessible database, or as a storage medium that can be easily considered by those skilled in the art to have the same function.

The access usage of the memory 10 is higher than the access usage of the storage device 14. For convenience of description, in the accelerated booting method 200 described below, the storage device 14 will be described using a hard disk as an example.

In step 210, a memory 10 is configured to pre-store a boot process to be performed on the first boot.

In one embodiment, the boot process is one of a plurality of executed processes in an Out-of-Box Experience (OOBE) set-up procedure. In other word, when the user firstly turns on the power of the notebook, desk, tablet, mobile phone or other electronic device, the boot process in these devices will be triggered. The OOBE set-up procedure includes downloading the files required for booting, running the operating system (such as Windows), welcome page, setting page (for example, selecting the web page, selecting the language, setting the account and password), and executing the process of installing the image of the particular program that was burned before leaving the factory and/or the guidance used for the first time use. Therefore, during the OOBE set-up procedure, the processor 12 executes a plurality of processes.

In one embodiment, in the step of installing the operating system (such as Windows), it is assumed that the accelerating boot time system 100 defines "LogonUI.exe", "FirstLogonAnim.exe", "WWAHost.exe" and other execution files to be executed during the OOBE set-up procedure. The processor 12 or the developer can use an instruction to store these execution files in the memory 10 (such as Optane™ memory) when entering the create image step.

In one embodiment, through existing application programming interface (API), the processor 12 detects the process which is only executed once when the processor 12 enters the create image step. The processes that are executed only once, such as "PowerDVD.exe", "FireFox.exe". Next, the accelerating boot time system 100 stores "PowerDVD.exe" and "FireFox.exe" (both of which are used to install the corresponding process, only once) in the memory 10.

In step 220, the process 12 directly reads the boot process from the memory 10 and executes the boot process when the first boot is performed.

In one embodiment, when the accelerating boot time system 100 enters the OOBE set-up procedure, the processor 12 directly reads the execution file, such as "LogonUI.exe", "FirstLogonAnim.exe", "WWAHost.exe", etc., from the memory 10 (such as, Optane™ memory) to speed up the efficiency of OOBE set-up procedure.

In one embodiment, when the accelerating boot time system 100 enters the OOBE set-up procedure, such as "PowerDVD.exe", "FireFox.exe", "WWAHost.exe", etc., from the memory 10 (such as, Optane™ memory) to speed up the efficiency of OOBE set-up procedure.

In step 230, the processor 12 executes a monitoring process to monitor a plurality of hardware usage rates of the plurality of devices each time the device is powered up, and inserts the hardware usage rates into a machine learning algorithm to determine whether a particular process supported by the devices is abnormal. If the particular process supported by the devices is abnormal, step 240 is performed. If the particular process supported by the devices is not abnormal, the method continues to perform step 230.

In one embodiment, since the processor 12 executes various processes at various stages, it is also possible to update or add a boot process in the daily operation of the user. Therefore, during the OOBE set-up procedure, the processes executed by the processor 12 are defined as particular processes, and these particular processes are monitored. These procedures are further described in the following paragraphs.

In one embodiment, the devices include the memory 10, processor 12 and/or a storage device (e.g., disk) 14. The hardware usage rates of these devices include the memory usage rate, the processor usage rate, or the hard disk usage rate. The memory usage rate refers to the usage of the main memory, not the usage of the memory 10 (such as, Optane™ memory).

After the processor 12 normalizes the hardware usage rates, the normalized hardware usage rates are substituted into the machine learning algorithm to know whether a device state is abnormal when each of the devices executes the particular process. If the device state is abnormal when at least one of the devices executes the particular process, the processor 12 determines that the particular process is abnormal.

For example, the processor 12 detects and records the time required for each boot through the existing programming interface, for example, as shown in the following table 1.

TABLE 1

| The n-th boot (the following values represent 'n') | Time required to boot (second) |
|---|---|
| 1 | 7 s |
| 2 | 8 s |
| 3 | 7.1 s |
| 4 | 7 s |
| 5 | 8.1 s |
| 6 | 7.2 s |
| 7 | 7 s |
| 8 | 8.88 s |
| 9 | 9.1 s |
| 10 | 9 s |
| 11 | 9.2 s |
| 12 | 9.1 s |
| 13 | 9.1 s |

Suppose that the values in Table 1 are counted in every 6 times referred to a group, so as to calculate the average boot time. If the average boot time is greater than a threshold (for example, 1.2 times the average boot time), it is determined that the accelerating boot time system 100 time starts to become slow. In the example in Table 1, the time required for booting at the $9^{th}$ boot is 9.1 s, which is greater than 1.2 times the average boot time (about 7.55 s) of the first 6 times (i.e., $3^{th}$-$8^{th}$). After the $9^{th}$ boot, the boot time of each of the next 4 times (i.e., $10^{th}$-$13^{th}$) is greater than 1.2 times the average boot time. At this time, the processor 12 determines that the boot time of the accelerated boot time system 100 starts to become slow. Also, the processor 12 starts to determine which processes make the boot time become slow after the $13^{th}$ boot. However, those skilled in the art should be able to understand that the method for determining whether the boot become slowly is not limited thereto.

The following paragraphs describe a method for determining abnormal process using a machine learning algorithm. In one embodiment, the machine learning algorithm is a Multilayer Perceptron (MLP) algorithm. Since the MLP algorithm is a known technique, it will not be described here.

In one embodiment, the processor 12 collects the boot time, the processor usage rates, the hard disk usage rates, the memory usage rates, and the like for executing all the processes, and labels each data for each boot procedure of the accelerating boot time system 100. There are five labels (Normal, Abnormal_CPU, Abnormal_DISK, Abnormal_CPU_DISK, Abnormal_MEMORY). The labels are defined in Table 2 below.

TABLE 2

| Type | Label | Definition |
| --- | --- | --- |
| 0 | Normal | Normal process |
| 1 | Abnormal_CPU | The process is not normal due to high processor usage |
| 2 | Abnormal_Disk | The process is not normal due to high hard disk usage |
| 3 | Abnormal_CPU_DISK | The process is not normal due to high processor usage and high hard disk usage |
| 4 | Abnormal_MEMORY | The process is not normal due to high memory usage |

Then, the processor 12 detects and records the time required for each boot, the hardware usage rates of the multiple devices, and the corresponding tags through the existing programming interface, as the original data to be substituted into the machine learning algorithm. The presentation of the original data is shown in Table 3.

TABLE 3

| Processor usage rate (microsecond) | Hard disk usage rate (kilo-byte, KB) | Memory usage rate (KB) | Boot time (second) | Label |
| --- | --- | --- | --- | --- |
| 551 | 1127 | 5120 | 7 | Normal |
| 551 | 1127 | 25580 | 7 | Normal |
| 551 | 1127 | 5120 | 9.1 | Normal |
| 5551 | 1127 | 5120 | 9.1 | Abnormal_CPU |
| 551 | 5901 | 5120 | 9.1 | Abnormal_Disk |
| 5551 | 5901 | 5120 | 9.2 | Abnormal_CPU DISK |
| 551 | 1127 | 25580 | 9.1 | Abnormal_MEMORY |
| 5551 | 1127 | 25580 | 9 | Abnormal_MEMORY |
| 551 | 5901 | 25580 | 9.1 | Abnormal_MEMORY |
| 5551 | 5901 | 25580 | 9.1 | Abnormal_MEMORY |

Then, each parameter in Table 3 is normalized by the Sigmoid function (normalization), so that the parameter range falls between −1 and 1, and the label is converted to the parameter between types 0 and 4 according to Table 2. These parameters are substituted into the machine learning algorithm as training data. In other words, the processor 12 converts the parameters of the initial data of Table 3 into the parameters of the training data. Also, the parameters of the training data are as shown in Table 4.

TABLE 4

| Processor usage rate (microsecond) | Hard disk usage rate (kilo-byte, KB) | Memory usage rate (KB) | Boot time (second) | Type |
| --- | --- | --- | --- | --- |
| −0.88 | −0.78 | −0.75 | −0.05 | 0 |
| −0.88 | −0.78 | 0.24 | −0.05 | 0 |
| −0.88 | −0.78 | −0.75 | 0.22 | 0 |
| 0.11 | −0.78 | −0.75 | 0.22 | 1 |
| −0.88 | 0.15 | −0.75 | 0.22 | 2 |
| 0.11 | 0.15 | −0.75 | 0.24 | 3 |
| −0.88 | −0.78 | 0.24 | 0.22 | 4 |
| 0.11 | −0.78 | 0.24 | 0.21 | 4 |
| −0.88 | 0.15 | 0.24 | 0.22 | 4 |
| 0.11 | 0.15 | 0.24 | 0.22 | 4 |

The aforementioned normalization method is used to standardize the parameters of the training data, and the known arithmetic method can be used, so it will not be described here.

The processor 12 substitutes the parameters of Table 4 into a machine learning algorithm. For example, the machine learning algorithm is a known Multilayer Perceptron algorithm for training, selecting a desired number of hidden layer, and the amount of neurons of each layer. Also, the processor 12 uses Softmax's function as the output layer, and defines five neurons in the output layer to predict the probability of each tag.

For example, the accelerating boot time system 100 detects the parameters shown in Table 5. After normalizing these parameters, as shown in Table 6, the parameters of Table 4 are substituted into the Multilayer Perceptron algorithm. Also, the prediction result shown in Table 7 can be obtained. Since the Multilayer Perceptron algorithm is a known algorithm, it will not be described in detail here.

TABLE 5

| Processor usage rate (microsecond) | Hard disk usage rate (kilo-byte, KB) | Memory usage rate (KB) | Boot time (second) |
| --- | --- | --- | --- |
| 551 | 1127 | 25580 | 8.9 |

TABLE 6

| Processor usage rate (microsecond) | Hard disk usage rate (kilo-byte, KB) | Memory usage rate (KB) | Boot time (second) |
| --- | --- | --- | --- |
| −0.88 | −0.78 | 0.24 | 0.2 |

TABLE 7

| Type 0 | Type 1 | Type 2 | Type 3 | Type 4 |
| --- | --- | --- | --- | --- |
| 0.02 | 0.01 | 0.01 | 0.01 | 0.78 |

According to the prediction results shown in Table 7, the type 4 (the process is abnormal due to the high memory usage rate) has the highest probability (0.78), which means that the processor usage rate and the hard disk usage rate correspond to the boot time (or their respective threshold values) is normal. The memory usage corresponds to a boot time that is higher than the normal value (or threshold), however. Therefore, the processor 12 infers that the process causes the memory usage rate to be abnormal. As such, the particular process calling this process is abnormal.

In step 240, when the processor 12 determines that the particular process supported by the devices is abnormal, the processor 12 issues instructions to store the particular process in the memory 10.

In one embodiment, when the process is abnormal, it may mean that the process requires more resources during the boot process. For example, it may cause excessive memory usage, excessive hard disk usage, and/or excessive processor usage when the process is executed. Therefore, when the processor 12 determines that the process supported by at least one of the devices is abnormal, the process is stored in the memory 10 having the faster access speed.

Figure 3:
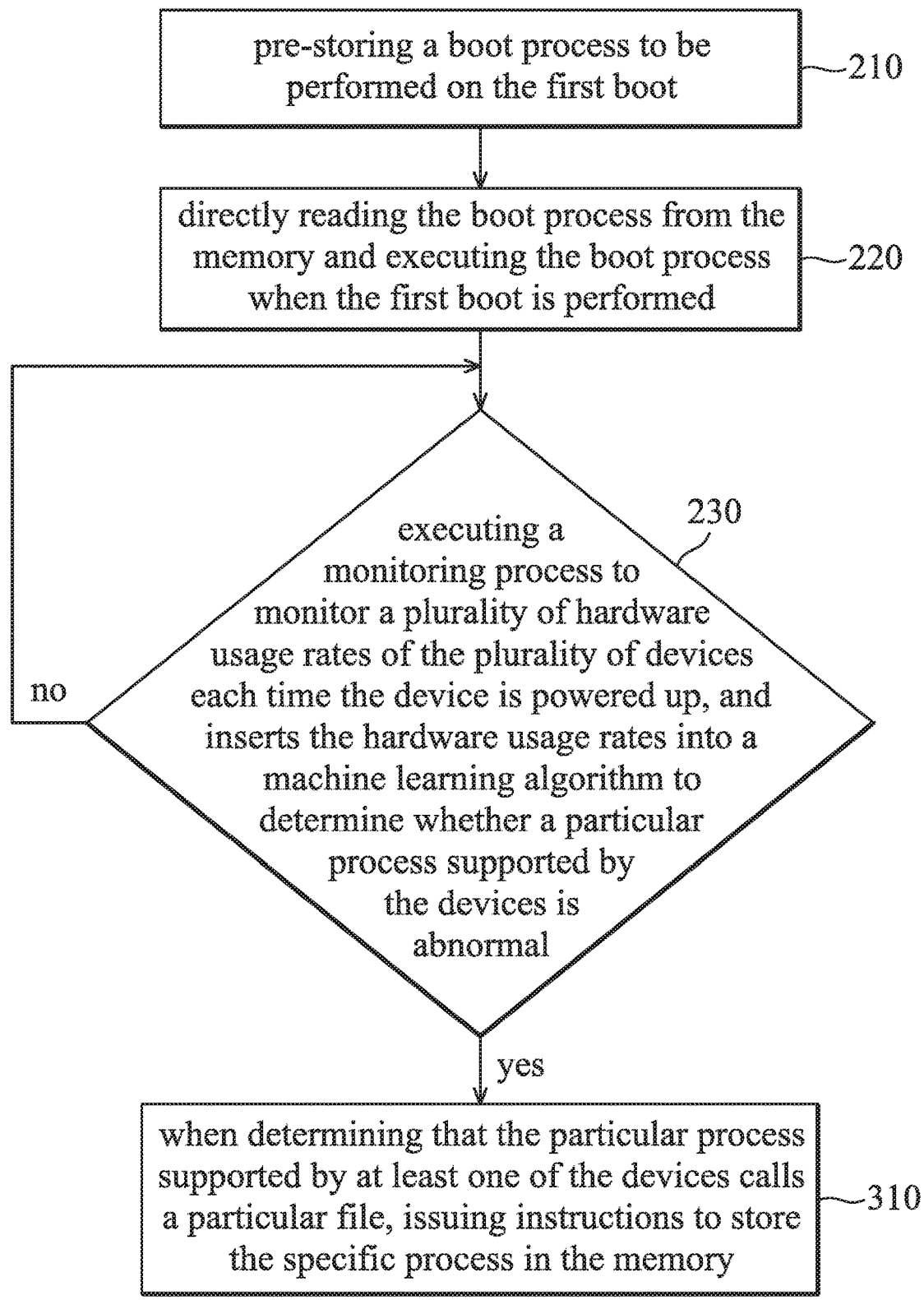
FIG. 3 is a flowchart of an accelerating boot time method in accordance with one embodiment of the present disclosure.

FIG. 3 is an accelerating boot time method 300 in accordance with one embodiment of the present disclosure. The difference between FIG. 2 and FIG. 3 is that, if the determining result is "yes", step 310 is performed.

In step 310, when the processor 12 determines that the particular process supported by at least one of the devices calls a particular file, the processor issues instructions to store the specific process in the memory.

In one embodiment, for a particular file, for example, a file conforming to the ".NET" format, more hardware resources are required to open or execute this type of file. In other words, during the boot process, when the processor 12 determines that the main memory, the processor 12, and/or the hard disk 14 require more hardware resources to perform the process of the particular file, the processor 12 stops executing the process of the particular file and stores the process of the particular file in the memory 10 (e.g., in Optane™ memory).

In this way, it is possible to avoid running a process that consumes excessive memory usage, processor usage, and/or hard disk usage during booting, resulting in too long a boot time. Furthermore, after storing this type of process to the memory 10, since the memory 10 provides a faster access speed, the processor 12 can quickly read the process from the memory 10 and execute the program.

Figure 4:
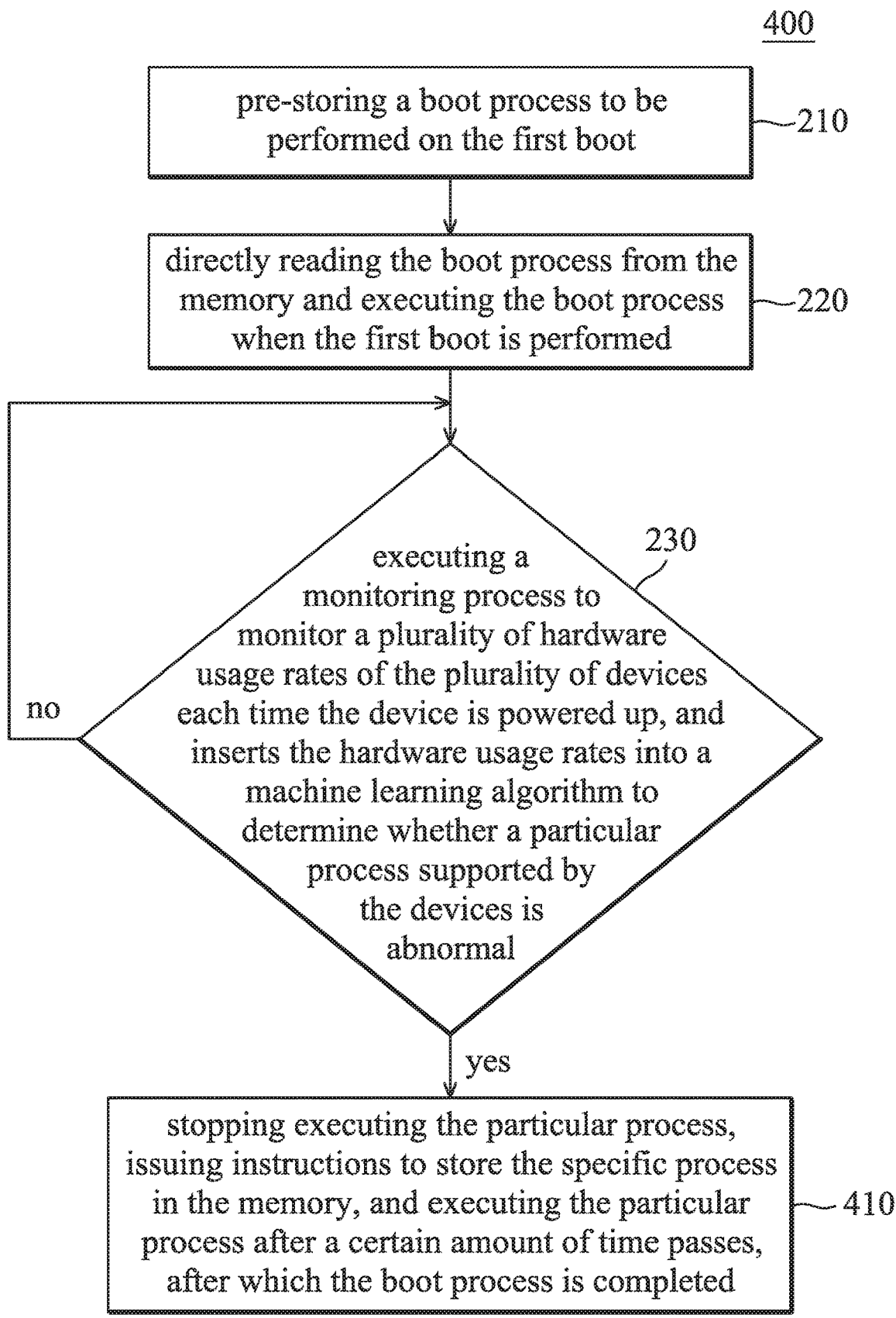
FIG. 4 is a flowchart of an accelerating boot time method of the data forwarding system in accordance with one embodiment of the present disclosure.

FIG. 4 is an accelerating boot time method 400 in accordance with one embodiment of the present disclosure. The difference between FIG. 4 and FIG. 2 is that, if the determining result is "yes", step 410 is performed.

In step 410, the processor 12 stops executing the particular process, issues instructions to store the specific process in the memory, and executes the particular process after a certain amount of time passes, after which the boot process is completed.

In one embodiment, during the boot process, the processor 12 determines that the particular process supported by the main memory, the processor 12, and/or the hard disk 14 is abnormal (for example, the one process called by another process causes a partial hardware usage rate to be higher than a threshold), the processor 12 stops executing the particular process, stores the particular process in the memory 10 (such as Optane™ memory), and executes the particular process after a certain period of time (for example, three minutes) after the booting is completed. In one embodiment, in addition to counting the boot time through the existing programming interface, the processor 12 also detects the processor usage, hard disk usage, and/or memory usage of all executed programs during each boot process. Then, the machine learning algorithm is used to determine whether the processor usage, the hard disk usage, and/or the memory usage required for each process during boot are abnormal, for example, as shown in Table 8.

TABLE 8

| Process | Processor usage rate (microsecond) | Hard disk usage rate (kilo-byte, KB) | Memory usage rate (KB) | Boot time (second) | Type |
| --- | --- | --- | --- | --- | --- |
| UBTService.exe | 0 | 0 | 5120 | 9.1 | 0 |
| ACCSvc.exe | 2 | 0 | 5120 | 9.1 | 0 |
| NortonSecurity.exe | 29 | 5901 | 5120 | 9.1 | 2 |

It can be seen from Table 8 that after the operation of machine learning algorithm, in these three processes, "NortonSecurity.exe" is an abnormal process whose abnormal type field value is 2, representing the type of the exception for this process making the hard disk usage rate too high. Therefore, the processor 12 stores "NortonSecurity.exe" in the memory 10.

In one embodiment, the processor 12 detects the file(s) (sub-process or data) through the programming interface. The file(s) (sub-process or data) is accessed or triggered when executing each process. That is, the sub-process also called the accompanying process, for example, as shown in Table IX.

TABLE IX

| Process | Accompanying process |
| --- | --- |
| UBTService.exe | C:\Windows\Microsoft.NET\Framework64\v4.0.30319\clr.dll . . . |
| ACCSvc.exe | C:\Windows\Microsoft.NET\Framework64\v2.0.50727\mscorwks.dll . . . |
| NortonSecurity.exe | C:\Program Files\Norton Security\Engine\22.15.16\ccGEvt.dll . . . |

When the processor 12 determines that the loaded or executed process requires a high hardware usage rate, the corresponding process is written in the memory 10. When the next time the accelerating boot time system 100 is turned on, and accelerating boot time system 100 need to execute this process, this process can be directly read by the memory 10 to achieve the effect of speeding up the boot time.

In this way, it is possible to avoid running a process that excessively consumes memory usage, processor usage, and/or hard disk usage during booting, avoid resulting in too long a boot time. In addition, after a certain period of time (for example, three minutes) after the booting is completed, the processor 12 can quickly read the process from the memory 10 and execute the program.

The accelerating boot time method and the accelerating boot time system shown in the present invention provide a method and a system of using a machine learning algorithm with the memory of Optane™ technology to accelerate the process of OOBE set-up procedure. Also, the boot time is improved for providing the overall boot efficiency.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An accelerating boot time system, comprising:
a memory, configured to pre-store a boot process to be performed on the first boot; and
a processor, configured to directly read the boot process from the memory and execute the boot process when the first boot is performed;
wherein the processor executes a monitoring process to monitor a plurality of hardware usage rates of a plurality of devices each time a device is powered up, and inserts the hardware usage rates into a machine learning algorithm to determine whether a particular process supported by at least one of the devices is abnormal;
wherein when the processor determines that the particular process supported by the at least one of the devices is abnormal, the processor issues instructions to store the particular process into the memory; and
wherein the next time the accelerating boot time system is turned on, the processor reads the particular process from the memory and executes the particular process.

2. The accelerating boot time system of claim 1, wherein the boot process is one of a plurality of executed processes in an Out-of-Box Experience (OOBE) set-up procedure.

3. The accelerating boot time system of claim 1, wherein the memory is a memory using Optane™ technology.

4. The accelerating boot time system of claim 1, wherein the devices comprise the memory, the processor, or a hard disk, and the hardware usage rates of the devices comprise memory usage rate, processor usage rate, or hard disk usage rate;
after the processor normalizes the hardware usage rates, the normalized hardware usage rates are substituted into the machine learning algorithm to determine whether a device state is abnormal when each of the devices executes the particular process; if the device state is abnormal when at least one of the devices executes the particular process, the processor determines that the particular process is abnormal.

5. The accelerating boot time system of claim 1, wherein the machine learning algorithm is a Multilayer Perceptron (MLP) algorithm.

6. The accelerating boot time system of claim 1, wherein when the processor determines that the particular process supported by at least one of the devices calls a particular file, the processor issues instructions to store a specific process in the memory.

7. The accelerating boot time system of claim 1, wherein when the processor determines that the particular process called by at least one of the devices is abnormal, the processor stops executing the particular process, issues instructions to store a specific process in the memory, and executes the particular process after a certain amount of time passes, after which the boot process is completed.

8. An accelerating boot time method, comprising:
pre-storing a boot process to be performed by a memory on the first boot;
directly reading the boot process from the memory and executing the boot process when the first boot is performed; and
executing a monitoring process to monitor a plurality of hardware usage rates of a plurality of devices each time the device is powered up, and substituting the hardware usage rates into a machine learning algorithm to determine whether a particular process supported by at least one of the devices is abnormal;
wherein when the processor determines that the particular process supported by the at least one of the devices is abnormal, the processor issues instructions to store the particular process into the memory; and
wherein the next time the accelerating boot time system is turned on, the processor reads the particular process from the memory and executes the particular process.

9. The accelerating boot time method of claim 8, wherein the boot process is one of a plurality of executed processes in an Out-of-Box Experience (OOBE) set-up procedure.

10. The accelerating boot time method of claim 8, wherein the memory is a memory using Optane™ technology.

11. The accelerating boot time method of claim 8, wherein the devices comprise the memory, a processor or a hard disk, and the hardware usage rates comprise the memory usage rate, the processor usage rate, or the hard disk usage rate;
after the processor normalizes the hardware usage rates, the normalized hardware usage rates are substituted into the machine learning algorithm to determine whether a device state is abnormal when each of the devices executes the particular process; if the device state is abnormal when at least one of the devices executes the particular process, the processor determines that the particular process is abnormal.

12. The accelerating boot time method of claim 8, wherein the machine learning algorithm is a Multilayer Perceptron (MLP) algorithm.

13. The accelerating boot time method of claim 8, further comprising:
when determining that the particular process supported by at least one of the devices calls a particular file, storing a specific process in the memory.

14. The accelerating boot time method of claim 8, further comprising:
when determining that the particular process called by at least one of the devices is abnormal, stopping the particular process, issuing instructions to store a specific process in the memory, and executing the particular process after a certain amount of time passes, after which the boot process is completed.

* * * * *